(12) United States Patent
Barkley-Yeung

(10) Patent No.: US 6,463,400 B1
(45) Date of Patent: Oct. 8, 2002

(54) QUARTER SECTIONING ALGORITHM

(76) Inventor: Ian Barkley-Yeung, 21063 Red Fir Ct., Cupertino, CA (US) 95014

( * ) Notice: Subject to any disclaimer, the term of this patent is extended or adjusted under 35 U.S.C. 154(b) by 0 days.

(21) Appl. No.: 09/241,157

(22) Filed: Feb. 1, 1999

(51) Int. Cl.$^7$ ............................................. G06F 165/00
(52) U.S. Cl. ...................... 702/158; 701/202; 701/209; 340/990
(58) Field of Search .......................... 702/158; 701/212, 701/209, 201, 202; 340/990, 995

(56) References Cited

U.S. PATENT DOCUMENTS

| | | | |
|---|---|---|---|
| 5,486,822 A | | 1/1996 | Tenmoku et al. ............ 340/995 |
| 5,774,824 A | * | 6/1998 | Streit .......................... 701/207 |
| 5,845,228 A | | 12/1998 | Uekawa et al. ............. 701/209 |
| 6,014,607 A | * | 1/2000 | Takeshi et al. ............. 701/200 |
| 6,125,323 A | * | 9/2000 | Ito ............................. 701/207 |
| 6,208,935 B1 | * | 3/2001 | Takaaki et al. ............. 701/209 |
| 6,259,987 B1 | * | 7/2001 | Timurceylan et al. ...... 701/200 |

* cited by examiner

Primary Examiner—Kamini Shah

(57) ABSTRACT

A polygon of an electronic map is prepared for dividing into quarter sections and tests are applied to determine if the polygon is too irregular for quarter sectioning. To prepare for quarter sectioning, a representative rectangle is defined having corners matching corners of the polygon. Tests to determine if the polygon should be quartered begin with a first test to weed polygons too triangular in shape. In the first test, ratios of the shortest to the longest length of opposite sides of the representative rectangle are taken. If either ratio is less than a predetermined number, the polygon is rejected from quarter sectioning. In a second test an angle difference is determined by measuring the angle each side of the representative quadrilateral makes with respect to the x-axis. If the difference in angles between two opposite sides is greater than a predetermined value, the polygon is rejected from quartering. A third test determines how close the representative rectangle comes to actually representing the polygon's shape by determining the distance between points on the polygon and the representative rectangle, and rejecting the polygon from quartering if any distance is greater than a predetermined amount. A fourth test determines how close the side of the representative rectangle follows the true lines of the polygon by determining a ratio of the total length of lines of the polygon connecting two corners to the length of a side of the representative rectangle connecting the corners, and if the ratio is greater than a predetermined number, rejecting the polygon from quartering.

14 Claims, 4 Drawing Sheets

QUARTER SECTIONING ALGORITHM

BACKGROUND OF THE INVENTION

1. Field of the Invention

The present invention relates to a method for identifying locations on a map. More particularly, the present invention relates to a method for locating and quarter sectioning an area on a map occupying a general polygon shape in an electronic map database.

2. Description of the Background Art

Electronic maps typically store latitude and longitude coordinates to identify geographical areas. To locate an area in the shape of a polygon, the longitude and latitude coordinates of points around the desired polygon are identified, and then lines connecting the points of the polygon are identified to locate the map data for the polygon.

Arizona's township sections are each intended to be square. To locate an Arizona township section, it would be desirable to simply identify the end point coordinates of the squares, and calculate the boundary lines for the square to identify the map data within the square. It would also be desirable to locate a "quarter section" of an Arizona township section square, such as a "Northwest Quarter", in a similar manner.

Unfortunately, limitations of physical terrain and 19th century surveying techniques when the Arizona township sections were originally established made the square sections less than perfect. Some were rectangles, others had a missing corner. Some were more parallelograms rather than squares, and some were just utterly irregular.

Quarter sections of Arizona township sections were even more crudely identified. To identify quarter sections for mapping in the past, a human operator typically eyeballed a section and decided how to break the section into quarters.

To use an electronic map to identify a quarter section of an irregular Arizona township section and roughly match previous map sectioning techniques, it would be desirable to have a computerized method which would perform quartering in a way similar to the way a human might, and reject (or refuse to quarter) a section a human would reject.

To quarter a section different from a way a human would may be undesirable. For instance, it could be dangerous to identify areas for excavation, or digs, using an electronic map which mathematically determines perfect quarters of a polygon, when a goal is to avoid cutting gas pipes and the gas pipes were originally located relative to quarter section boundaries determined by human eyeballing.

SUMMARY OF THE INVENTION

In accordance with the present invention a method is provided for preparing a polygon in an electronic map database to be divided into quarters and for applying one or more tests to determine if the polygon is too irregular and should be rejected from quarter sectioning.

In one embodiment, before preparing a list of polygons for quartering, the list is scanned to find duplicate township section identifiers. Any section which is identified by multiple polygons is automatically rejected. In addition, any polygon whose identifier does not look like a township section identifier is also automatically rejected.

To prepare the polygon for quarter sectioning, the most northwest (NW), most northeast (NE), most southeast (SE), and most southwest (SW) point on the polygon are determined. A representative rectangle is then defined with the same corners.

Tests applied to determine if the polygon should be rejected from quartering include a first test to weed out a polygon which is too triangular, or where two corners of the representative rectangle are the same point. In the first test, ratios of the shortest to the longest length of opposite sides of the representative rectangle are taken. If either ratio is less than a predetermined number, the polygon is rejected from being divided into quarter sections.

A second test is an angle difference test. In the second test, an angle each side of the representative rectangle makes with respect to the x-axis is measured. If the difference in angles between two opposite sides is greater than a predetermined value, the polygon is rejected from quartering.

A third test determines how close the representative rectangle comes to actually representing the polygon's shape. In the third test, each point on the polygon between two corners is identified as "belonging on" the side of the representative rectangle connecting the two corners. Next, a distance between each point on the polygon and the side it "belongs on" is computed. The ratio of each distance to the average length of the four sides of the representative rectangle is then computed. If the ratio is greater than a predetermined number, the polygon is rejected.

A fourth test determines how closely the side of the representative rectangle follows the true lines of the polygon. In the fourth test, line segments between points on the polygon are each assigned to "belong on" a side of the representative rectangle if either of its points belong on that side. A ratio of the sum of the lengths of the line segments of the polygon that belong on a given side to the total length of the side of the representative rectangle is then taken. If the ratio is greater than a predetermined number, the polygon is rejected.

Once a polygon passes all tests, quartering is performed. For quartering, lines between the midpoints of opposite sides of the representative rectangle are drawn. The polygon is then divided into quarters using these lines.

BRIEF DESCRIPTION OF THE DRAWINGS

Further details of the present invention are explained with the help of the attached drawings in which.

DETAILED DESCRIPTION

The present invention begins with a method to prepare a polygon for quarter sectioning by defining a "representative rectangle" (technically a quadrilateral) for a polygon which represents a rectangularness of the polygon. The method then determines if the polygon is regular enough for quarter sectioning, and if so lines are drawn that would quarter the representative rectangle, and those lines are used to quarter the original polygon.

The representative rectangle's corners are chosen as the most northwestern point of the polygon, the most northeastern point of the polygon, the most southwestern point, and the most southeastern. In other words, if the polygon was represented as an array of points in Cartesian space, the corners of the representative rectangle are represented as the maximum (x+y), the minimum (x+y), the maximum (x−y) and the minimum (x−y). A rectangle between those points may then be formed and quartered by drawing lines between the midpoints of opposite sides. The lines for quartering the rectangle may then be used to quarter the polygon.

Figure 1A:
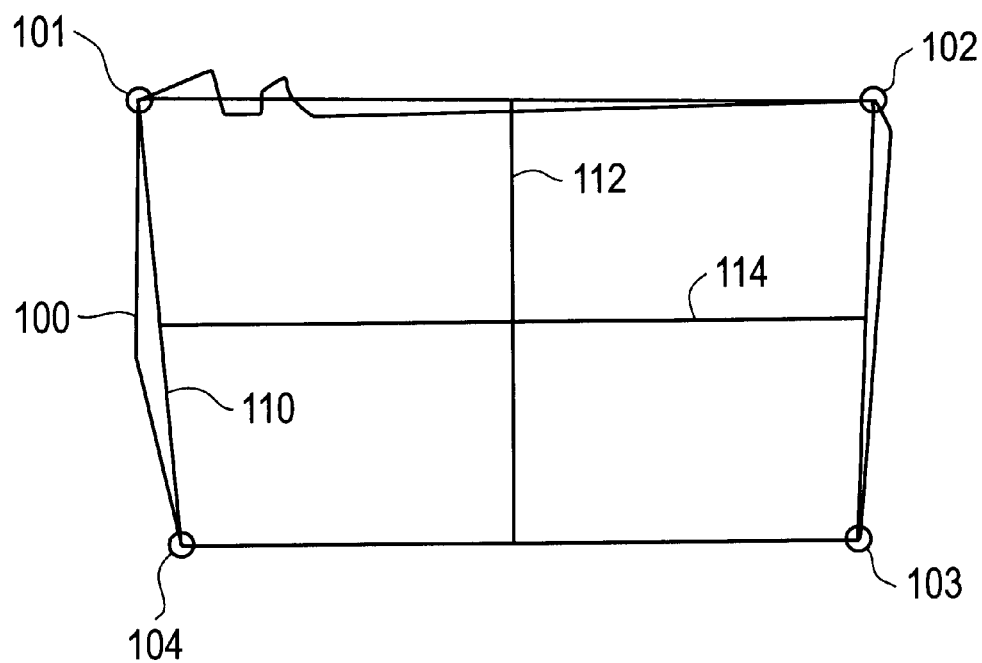
FIG. 1A shows a first respective polygon identified for quarter sectioning.
Figure 1B:
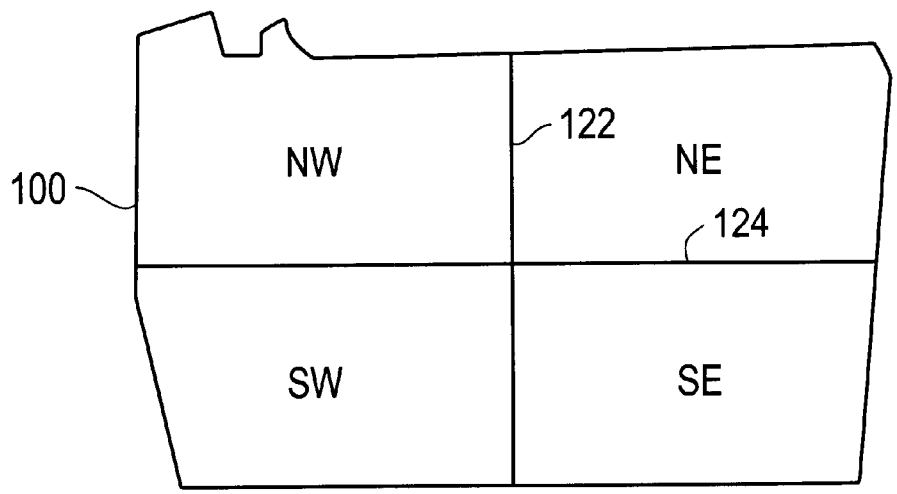
FIG. 1B shows the first polygon of FIG. 1A as finally quarter sectioned.

FIG. 1A shows a first respective polygon 100 identified for quarter sectioning. The northwest (NW) corner 101, the northeast (NE) corner 102, the southeast (SE) corner 103 and the southwest (SW) corner 104 of the polygon 100 of FIG. 1A are identified according to the method of the present invention to determine a representative rectangle 110. The representative rectangle 110 is then quarter sectioned by lines 112 and 114 provided between the midpoints of the lines forming rectangle 110. FIG. 1B then shows the polygon 100 as finally quartered by lines 122 and 124 which are formed by resetting the length of lines 112 and 114 to terminate on lines of the polygon 100.

Figure 2A:
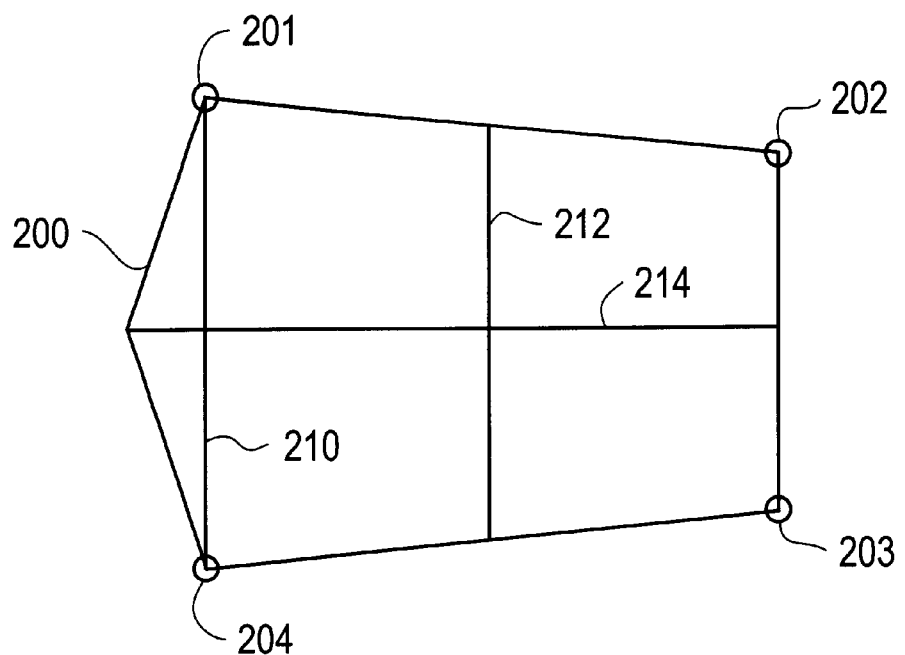
FIG. 2A shows a second respective polygon identified for quarter sectioning.
Figure 2B:
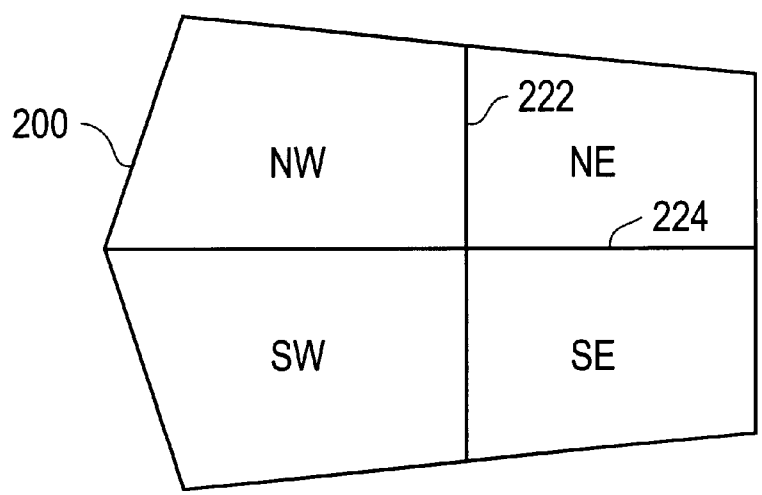
FIG. 2B shows the second polygon of FIG. 2A as finally quarter sectioned.

FIG. 2A shows a second respective polygon 200 identified for quarter sectioning. The NW corner 201, the NE corner 202, the SE corner 203 and the SW corner 204 of the polygon 200 are determined to identify a representative rectangle 210 according to the present invention. The representative rectangle 210 is then quarter sectioned by lines 212 and 214 provided between the midpoints of the lines forming rectangle 210. FIG. 2B then shows the polygon 200 as finally quartered by lines 222 and 224 which are formed from lines 212 and 214.

By quartering the representative polygon of FIG. 2A, an important feature of the present invention is identified as the quartering lines 212 and 214 used to form the final quartering lines 222 and 224, as opposed to the representative rectangle 210. For instance, a human might have drawn the top side 220 of the representative rectangle at a little bit over one way or the other, but the quartering of the present invention is still reasonable because the effective averaging of the two points 201–202 to get the midpoint 222 reduces the effect of a small mispositioning of any one line by half.

The above method provides desirable results and can quarter substantially all polygons. To selectively refuse to quarter a polygon which a human might not quarter, the present invention provides steps for evaluating a section to determine if a human would perform sectioning.

For polygons, such as the Arizona township sections which have been previously defined and have an identifying name or map label which can be stored in the map database, the method of the present invention in one embodiment performs two tests before defining a representative rectangle. The first test is on the name of the polygon. The method reads a polygon and its name in from a disk file. If the name provided does not look like a township section identifier, the method rejects the polygon from quartering. For example, a township identifier might have the pattern T##.#NR##.#W##, where # indicates an integer. With such a pattern, the identifier T03.0NR12.5W03 would be accepted, while the identifier T03.0NR12.5W would be rejected. By rejecting a polygon, the method passes the polygon unchanged to an output or display file, instead of writing four separate quarter section polygons to the output.

In the second test, the method of the present invention looks through the list of polygons identified for quarter sectioning to find if two or more polygons share the same name. The method generates such a list of identifier names by scanning an entire input for polygons to be sectioned. If the method determines that a name is common to two or more polygons, a township section containing the polygons is comprised of disjoint polygons, and the method rejects the polygons from quartering.

If the first and second tests are passed, the present invention proceeds to determine the four corner points of the "representative rectangle" as described above. After the representative rectangle is determined, the present invention in one embodiment proceeds to apply four tests to determine if a human would proceed to quarter a polygon as detailed below.

In a first test a ratio of the lengths of the opposite sides of the representative rectangle are compared with a minimum value to determine if the polygon is close enough to being a parallelogram. In particular, the first test weeds out the degenerate case where two corners of the representative rectangle are the same point, or where the polygon is more triangular than anything else. It also weeds out a case where the polygon has sides skewed more than 45° from a flat rectangle.

In the first test, the method computes a length of the east side of the representative rectangle by measuring a distance between its NE and SE corner points, and the length of the west side by measuring a distance between the NW and SW points. The method then computes the ratio of the shorter side to the longer. A ratio with zero as a denominator is assigned a value of 0. If the ratio is less than a predetermined value (MIN_SIDE_LENGTH_RATIO), the polygon is rejected. If the ratio is greater than (MIN_SIDE_LENGTH_RATIO), but less than another predetermined number (WARN_SIDE_LENGTH_RATIO), a warning is logged in a file and but processing continues. The warning gives a user an opportunity to set the predetermined value for MIN_SIDE_LENGTH_RATIO to a desired level. The first test is then repeated with the north and south sides of the representative rectangle.

Figure 3A:
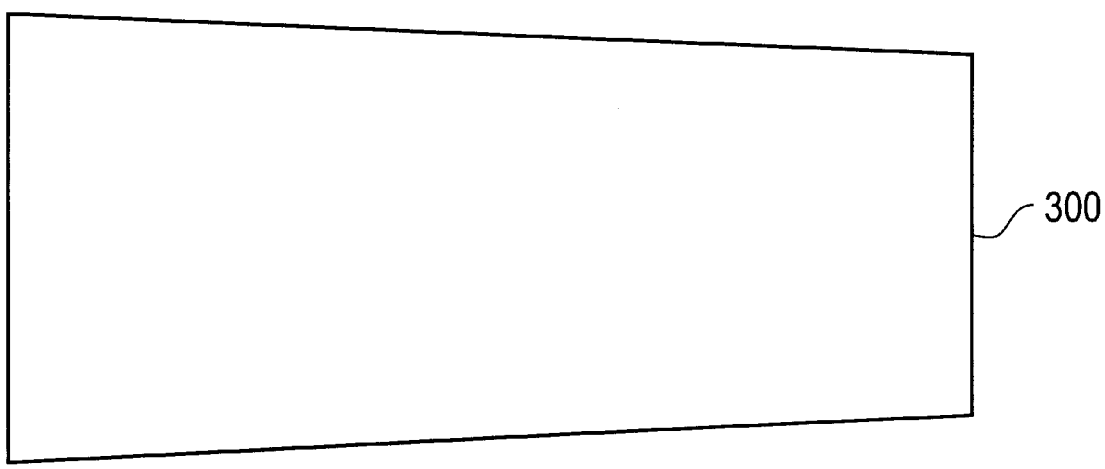
FIGS. 3A and 3B illustrate how the thinness or thickness of a polygon affects a first test applied to determine if a polygon should be quarter sectioned.
Figure 3B:
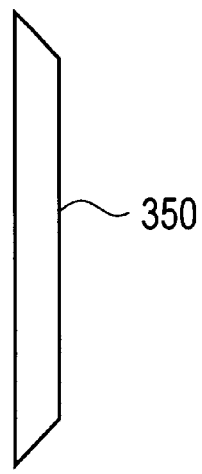

The first test is sensitive to parallelogramness in long thin rectangles, but is very insensitive in more square ones. FIGS. 3A and 3B show polygons 300 and 350 to illustrate this point. The polygons 300 and 350 have the same east-to-west ratio of about 0.8, yet the polygon 350 looks far less rectangular. Therefore, if the MIN_SIDE_LENGTH_RATIO is set too close to 1.0, many good thin rectangles are rejected. If the MIN_SIDE_LENGTH_RATIO is set too close to 0.0, the first test does little to filter polygons. For the method of the present invention, the MIN_SIDE_LENGTH_RATIO is preferably set to about 0.5 to weed out the more egregious cases, and the second test described below is used to do more weeding.

The second test is an angle difference test. In the second test, an angle each side of the representative rectangle makes with respect to the x-axis is measured. If the difference in angles between two opposite sides is greater than a predetermined value (MAX_ANGLE_DIFFERENCE), the polygon is rejected. For the second test, the value for MAX_ANGLE_DIFFERENCE can be set as high as 10° without rejecting a significant number of desirable polygons which a human would likely section. As with the first test, in a second test a warn-but-do-not-reject number (WARN_ANGLE_DIFFERENCE), constitutes a lower hurdle and is set for test purposes so that a warning indication is stored in a file to indicate when a higher number than the MAX_ANGLE_DIFFERENCE is obtained. For example, with MAX_ANGLE_DIFFERENCE at 10°, WARN_ANGLE_DIFFERENCE could be set at 5° and slowly increased toward 10° to assure 10° is adequate.

The third test determines how close the "representative quadrilateral" comes to actually representing the polygon's shape. In the third test, each point on the original polygon except the four corners is identified as "belonging on" one of the four sides of the representative rectangle. For instance with all of the points of the polygon considered in order starting with the NW corner, all points listed between the NW and NE corners would "belong on" the north side of the representative rectangle. All the points between the NE and SE corners would "belong on" the east side, etc. The method step of assigning points of the polygon is purely a function or ordering. For instance, a point of the polygon may "belong on" a side of the representative rectangle even if it is closer to another side of the representative rectangle.

Figure 4:
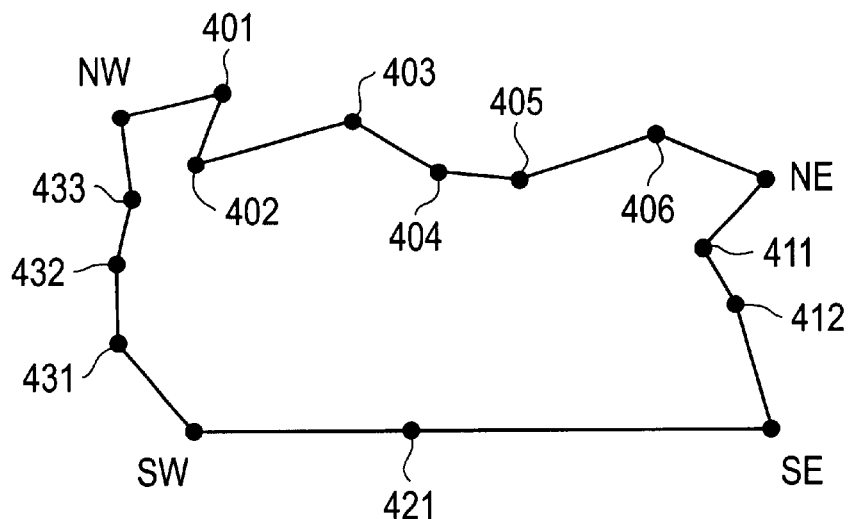
FIG. 4 is used to illustrate how points are assigned to "belong on" a side of a representative rectangle.

FIG. 4 illustrates how the method of the third test assigns points on a polygon to "belong on" a side of the representative rectangle. For the polygon of FIG. 4, the method of the third test assigns points 401–406 between the NW and NE corners to "belong on" the north side of a representative rectangle. Points 411–412 between the NE and SE corners are assigned to belong on the east side, point 421 between the SE and SW sides is assigned to belong on the south side, and points 431–433 between the SW and NW corners are assigned to belong on the west side.

For the third test, a distance between each point on the polygon and the side it "belongs on" is computed. The ratio of each distance to the average length of the four sides is then computed. If the ratio is greater than a predetermined number MAX_DISTANCE_RATIO (for example 0.1), the polygon is rejected. Another predetermined number WARN_DISTANCE_RATIO is set as before for test purposes. If the ratio is greater than a preselected number WARN_DISTANCE_RATIO (for example 0.75), a warning is stored in a file.

In a fourth test, line segments between points on the polygon are each assigned to "belong on" a side of the representative rectangle if either of its points belong on that side. The test then determines how closely the side of the representative quadrilateral follows the true lines of the polygon by computing the ratio of the sum of the lengths of the line segments of the polygon that belong on a given side to the total length of the side of the representative rectangle. The ratio will always be ≧1.0 since the length of the side of the representative rectangle is the straight-line distance between the two corners of the polygon. If, for any side of the representative rectangle, the ratio is greater than a predetermined number MAX_ARC_RATIO (for example 1.05), the polygon is rejected. If the ratio is greater than another preselected number WARN_ARC_RATIO (for example 1.03) set for test purposes, a warning is stored in a file.

Once a polygon passes all of the above four tests, quartering is performed. For quartering, a line between the midpoint of the north side of the representative rectangle and the midpoint of its south side is computed. Further, a line between the midpoint of the west side and the midpoint of the east side of the representative rectangle is computed. The polygon is then divided by these midpoint lines (or quartering lines) into quarters.

After the quartering lines are determined for the polygon, the method of the present invention separates out four quartered polygons formed by the original polygon as divided by the quartering lines. To form the new polygons, the points of the polygon are each checked to identify on which side of the quartering lines a line segment on the polygon sits, or if the line segment crosses a quartering line. For each line segment of the polygon that crosses the quartering line, the intersection point of the line segment and the quartering line is found, and the line segment is divided at that new point. Next, each of the four new quartered polygons are computed by going around the original polygon and adding points to one of the quarter-polygons based on which side of the quarter section lines the point falls. Points on the quarter section lines (which include the just-added line intersection points) get placed in both quarter-polygons, followed by the point where the two quartering lines intersect (at the center of the polygon).

In addition to the four tests described above, two additional tests may optionally be applied to assure a polygon is one a human might quarter. A first test determines how close the polygon is to a rectangle. In the first test it is determined within a predetermined number of degrees how close the north and south sides of the representative rectangle are to being parallel to the x-axis. It is further determined within a predetermined number of degrees how close the east and west sides are close to parallel to the y-axis. If the number of degrees for each test are unacceptable, the polygon is rejected.

The second is a test to assure squareness. In the second test, a first average length of the north and south sides of a representative rectangle and a second average length of the east and west sides of the representative rectangle are computed. If the ratio of the difference between the first and second average numbers to the average length of all four sides of the representative rectangle is greater than a predetermined value, the polygon is rejected.

Figure 5:
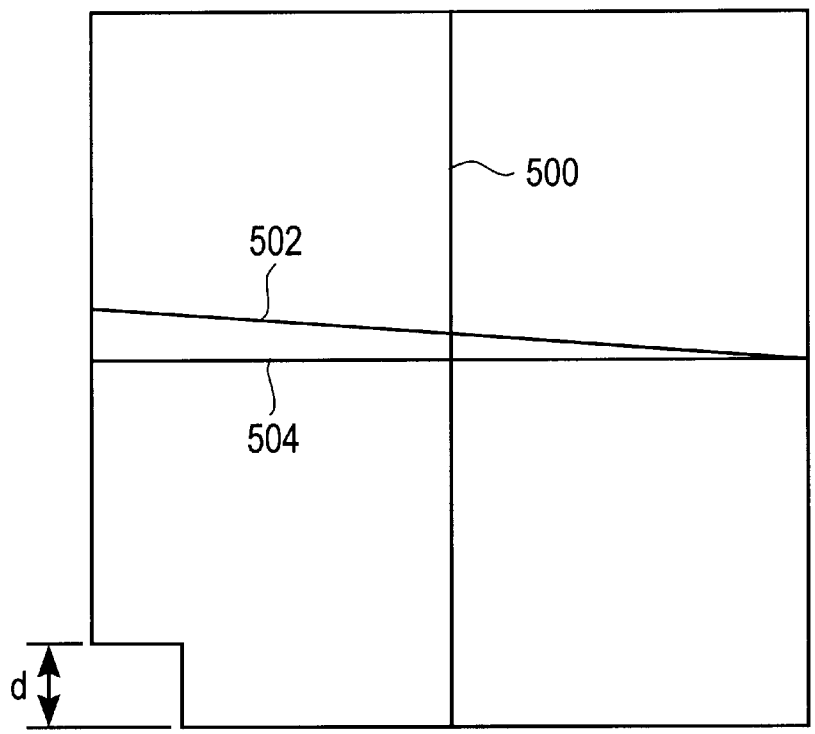
FIG. 5 illustrates quarter sectioning of a polygon with a missing corner.

One data problem encountered when quartering Arizona's township sections is a polygon which has a "missing corner", or a small square cut out of its side as shown in FIG. 5. In FIG. 5, the north-south quartering line 500 is ideal, while the east-west quartering line 502 is only ½ of the distance d off from an ideal quartering line 504 in the worst case on the west side, where d is the length of the small square along the west side of the polygon. The tests used to reject polygons described above can prevent d from growing too large, and will limit errors due to the "missing corner".

Although the present invention has been described above with particularity, this was merely to teach one of ordinary skill in the art how to make and use the invention. Many other modifications will fall within the scope of the invention, as that scope is defined by the claims provided below.

What is claimed is:

1. A method of determining when a polygon identified in an electronic map should be rejected from being divided into quarter sections, the method comprising the steps of:

determining a most northwest (NW), northeast (NE), southeast (SE) and southwest (SW) point on the polygon;

defining a representative quadrilateral as having corners which are the most NW, NE, SE and SW points on the polygon, wherein a north side of the representative quadrilateral is formed by a line between the NW and NE points, a south side of is formed by a line between the SE and SW points, an east side is formed by a line between the NE and SE points and a west side is formed by a line between the NW and SW points;

calculating a first ratio as a shortest to a longest of the north side and south side of the representative quadrilateral;

calculating a second ratio as a shortest to a longest of the east side and the west side of the representative quadrilateral; and rejecting the polygon from being divided into quarter sections when one of the first and second ratios is less than a first predetermined number.

2. The method of claim 1, wherein the first predetermined number is 0.5.

3. The method of claim 1, further comprising the steps of:

calculating a first angle between the north side of the representative quadrilateral and an x-axis;

calculating a second angle between the south side of the representative quadrilateral and the x-axis;

calculating a first difference between the first and second angles;

calculating a third angle between the east side of the representative quadrilateral and the x-axis;

calculating a fourth angle between the west side of the representative quadrilateral and the x-axis; and calculating a second difference between the second and third angles; and rejecting the polygon from being divided into quarter sections when one of the first difference and the second difference is greater than a second predetermined number.

4. The method of claim 3, wherein the second predetermined number is 10 degrees.

5. The method of claim 3 further comprising the steps of:

identifying points between the most NW and NE points of the polygon as belonging on the north side of the representative quadrilateral;

identifying points between the most NE and SE points of the polygon as belonging on the east side of the representative quadrilateral;

identifying points between the most SE and SW points of the polygon as belonging on the south side of the representative quadrilateral;

identifying points between the most SW and NW points of the polygon as belonging on the west side of the representative quadrilateral;

calculating a distance between each of the points identified as belonging on a side of the representative quadrilateral and the side the point belongs on;

calculating a ratio of the distance to the average length of the north, south, east and west sides of the representative quadrilateral for each of the identified points; and rejecting the polygon from being divided into quarters when the ratio for one of the identified points is greater than a third predetermined number.

6. The method of claim 5 further comprising the steps of:

identifying line segments between points located from the most NW to the most NE points of the polygon as belonging on the north side of the representative quadrilateral;

calculating a first ratio as the sum of the lengths of the line segments belonging on the north side to a length of the north side of the representative quadrilateral;

rejecting the polygon from being divided into quarter sections when the first ratio is greater than a fourth predetermined number;

identifying line segments between points located from the most NE to the most SE points of the polygon as belonging on the east side of the representative quadrilateral;

calculating a second ratio as the sum of the lengths of the line segments belonging on the east side to a length of the east side of the representative quadrilateral;

rejecting the polygon from being divided into quarter sections when the second ratio is greater than the fourth predetermined number;

identifying line segments between points located from the most SE to the most SW points of the polygon as belonging on the south side of the representative quadrilateral;

calculating a third ratio as the sum of the lengths of the line segments belonging on the south side to a length of the south side of the representative quadrilateral;

rejecting the polygon from being divided into quarter sections when the third ratio is greater than the fourth predetermined number;

identifying line segments between points located from the most SW to the most NW points of the polygon as belonging on the west side of the representative quadrilateral;

calculating a fourth ratio as the sum of the lengths of the line segments belonging on the west side to a length of the west side of the representative quadrilateral; and rejecting the polygon from being divided into quarter sections when the fourth ratio is greater than the fourth predetermined number.

7. The method of claim 1, further comprising the steps of:

calculating a first angle between the north side of the representative quadrilateral and an x-axis;

calculating a second angle between the south side of the representative quadrilateral and the x-axis;

calculating a third angle between the east side of the representative quadrilateral and a y-axis;

calculating a fourth angle between the west side of the representative quadrilateral and the y-axis; and rejecting the polygon from being divided into quarter sections when one of the first, second, third and fourth angles is greater than the second predetermined number.

8. The method of claim 7 further comprising the steps of:

determining the first average length of the west side and the east side of the representative quadrilateral;

determining a second average length of the north side and the south side of the representative quadrilateral;

determining a third average length of the north, south, east and west side of the representative quadrilateral; and rejecting the polygon from being divided into quarter sections when a ratio of a magnitude of a difference between the first average length and the second average length to the third average length is less than a third predetermined number.

9. A method of determining when a polygon identified in an electronic map should be rejected from being divided into quarter sections, the method comprising the steps of:

determining a most northwest (NW), northeast (NE), southeast (SE) and southwest (SW) point on the polygon;

defining a representative quadrilateral as having corners which are the most NW, NE, SE and SW points on the polygon, wherein a north side of the representative quadrilateral is formed by a line between the NW and NE points, a south side of is formed by a line between the SE and SW points opposite the north side, an east side is formed by a line between the NE and SE points, and a west side is formed by a line between the NW and SW points opposite the east side;

calculating angles between opposite sides of the representative quadrilateral and an x-axis;

rejecting the polygon from being divided into quarter sections when a difference between the angles is greater than a predetermined number.

10. A method of determining when a polygon identified in an electronic map should be rejected from being divided into quarter sections, the method comprising the steps of:

determining a most northwest (NW), northeast (NE), southeast (SE) and southwest (SW) point on the polygon;

defining a representative quadrilateral as having corners which are the most NW, NE, SE and SW points on the polygon, wherein a north side of the representative quadrilateral is formed by a line between the NW and NE points, a south side of is formed by a line between the SE and SW points, an east side is formed by a line between the NE and SE points and a west side is formed by a line between the NW and SW points;

identifying points of the polygon between corners defining a particular one of the sides of the representative quadrilateral as belonging on the particular side of the representative quadrilateral;

calculating a ratio of the distance between each of the points identified as belonging on the particular side of the representative quadrilateral and the particular side; and rejecting the polygon from being divided into quarter sections when the ratio for one of the identified points is greater than a predetermined number.

11. A method of determining when a polygon identified in an electronic map should be rejected from being divided into quarter sections, the method comprising the steps of:

determining a most northwest (NW), northeast (NE), southeast (SE) and southwest (SW) point on the polygon;

defining a representative quadrilateral as having corners which are the most NW, NE, SE and SW points on the polygon, wherein a north side of the representative quadrilateral is formed by a line between the NW and NE points, a south side of is formed by a line between the SE and SW points, an east side is formed by a line between the NE and SE points and a west side is formed by a line between the NW and SW points;

identifying particular line segments connecting points on the polygon between the corners defining a given one of the sides of the representative quadrilateral as belonging on the given side of the representative quadrilateral;

calculating a ratio of the sum of the lengths of the particular line segments belonging on the given side to a length of the given side; and rejecting the polygon from being divided into quarter sections when the ratio is greater than a predetermined number.

12. A method of determining when a polygon identified in an electronic map should be rejected from being divided into quarter sections, the method comprising the steps of:

determining a most northwest (NW), northeast (NE), southeast (SE) and southwest (SW) point on the polygon;

defining a representative quadrilateral as having corners which are the most NW, NE, SE and SW points on the polygon, wherein a north side of the representative quadrilateral is formed by a line between the NW and NE points, a south side of is formed by a line between the SE and SW points, an east side is formed by a line between the NE and SE points and a west side is formed by a line between the NW and SW points;

calculating angles between opposite sides of the representative quadrilateral and a y-axis;

rejecting the polygon from being divided into quarter sections when a difference between the angles is greater than a predetermined number.

13. A method of determining when a polygon identified in an electronic map should be rejected from being divided into quarter sections, the method comprising the steps of:

determining a most northwest (NW), northeast (NE), southeast (SE) and southwest (SW) point on the polygon;

defining a representative quadrilateral as having corners which are the most NW, NE, SE and SW points on the polygon, wherein a north side of the representative quadrilateral is formed by a line between the NW and NE points, a south side of is formed by a line between the SE and SW points, an east side is formed by a line between the NE and SE points and a west side is formed by a line between the NW and SW points;

determining the first average length of the west side and the east side of the representative quadrilateral;

determining a second average length of the north side and the south side of the representative quadrilateral;

determining a third average length of the north, south, east and west side of the representative quadrilateral; and rejecting the polygon from being divided into quarter sections when a ratio of a magnitude of a difference between the first average length and the second average length to the third average length is less than a predetermined number.

14. A method of dividing a polygon identified in an electronic map into quarter sections, the method comprising the steps of:

determining a most northwest (NW), northeast (NE), southeast (SE) and southwest (SW) point on the polygon;

defining a representative quadrilateral as having corners which are the most NW, NE, SE and SW points on the polygon, wherein a north side of the representative quadrilateral is formed by a line between the NW and NE points, a south side is formed by a line between the SE and SW points opposite the north side, an east side is formed by a line between the NE and SE points, and a west side is formed by a line between the NW and SW points opposite the east side; and defining quartering lines, each between midpoints of opposite sides of the representative quadrilateral.

* * * * *

UNITED STATES PATENT AND TRADEMARK OFFICE
CERTIFICATE OF CORRECTION

PATENT NO. : 6,463,400 B1
DATED : October 8, 2002
INVENTOR(S) : Ian Barkley-Yeung It is certified that error appears in the above-identified patent and that said Letters Patent is hereby corrected as shown below:

<u>Title page,</u>
Insert -- [73] Assignee: Tele Atlas North America, Inc., Menlo Park, CA (US) --

Insert -- [74] *Attorney, Agent, or Firm*, Fliesler Dubb Meyer & Lovejoy LLP --

Signed and Sealed this

Third Day of June, 2003

JAMES E. ROGAN
*Director of the United States Patent and Trademark Office*